United States Patent [19]

Clark et al.

[11] Patent Number: 5,186,806
[45] Date of Patent: Feb. 16, 1993

[54] CERAMIC DISTRIBUTION MEMBERS FOR SOLID STATE ELECTROLYTE CELLS AND METHOD OF PRODUCING

[75] Inventors: Douglas J. Clark, Ontario; Leo M. Galica, Mira Loma; Robert W. Losey, Lancaster; Jerry W. Suitor, El Toro, all of Calif.

[73] Assignee: California Institute of Technology, Pasadena, Calif.

[21] Appl. No.: 636,484

[22] Filed: Dec. 31, 1990

[51] Int. Cl.$^5$ .............................................. C25B 9/00
[52] U.S. Cl. ...................... 204/265; 204/266; 204/258; 204/260; 204/426; 204/429; 204/424; 429/30; 429/32
[58] Field of Search .............. 204/424, 425, 426, 427, 204/428, 429, 265, 266, 247, 258, 260, 59 R; 423/219; 429/30, 32

[56] References Cited

U.S. PATENT DOCUMENTS

| | | | |
|---|---|---|---|
| 4,344,832 | 8/1982 | Dahlberg | 204/258 |
| 4,426,261 | 1/1984 | Fushihara | 204/260 |
| 4,857,420 | 8/1989 | Maricle et al. | 429/30 |
| 4,885,142 | 12/1989 | Suitor et al. | 423/219 |
| 4,957,673 | 9/1990 | Schroeder et al. | 264/60 |

OTHER PUBLICATIONS

Proceedings of the 23rd Intersociety Energy Conversion Conference, vol. 2, ASME, New York, 1988, pp. 273-277, by Suitor et al.

*Primary Examiner*—John Niebling
*Assistant Examiner*—Kathryn Gorgos
*Attorney, Agent, or Firm*—F. Eugene Logan

[57] ABSTRACT

A solid state electrolyte cells apparatus and method of producing is disclosed. The apparatus can be used for separating oxygen from an oxygen-containing feedstock or as a fuel cell for reacting fluids. Cells can be stacked so that fluids can be introduced and removed from the apparatus through ceramic distribution members having ports designed for distributing the fluids in parallel flow to and from each cell. The distribution members can also serve as electrodes to membranes or as membrane members between electrodes. The distribution member design does not contain any horizontal internal ports which allows the member to be thin. A method of tape casting in combination with an embossing method allows intricate radial ribs and bosses to be formed on each distribution member. The bosses serve as seals for the ports and allow the distribution members to be made without any horizontal internal ports.

49 Claims, 3 Drawing Sheets

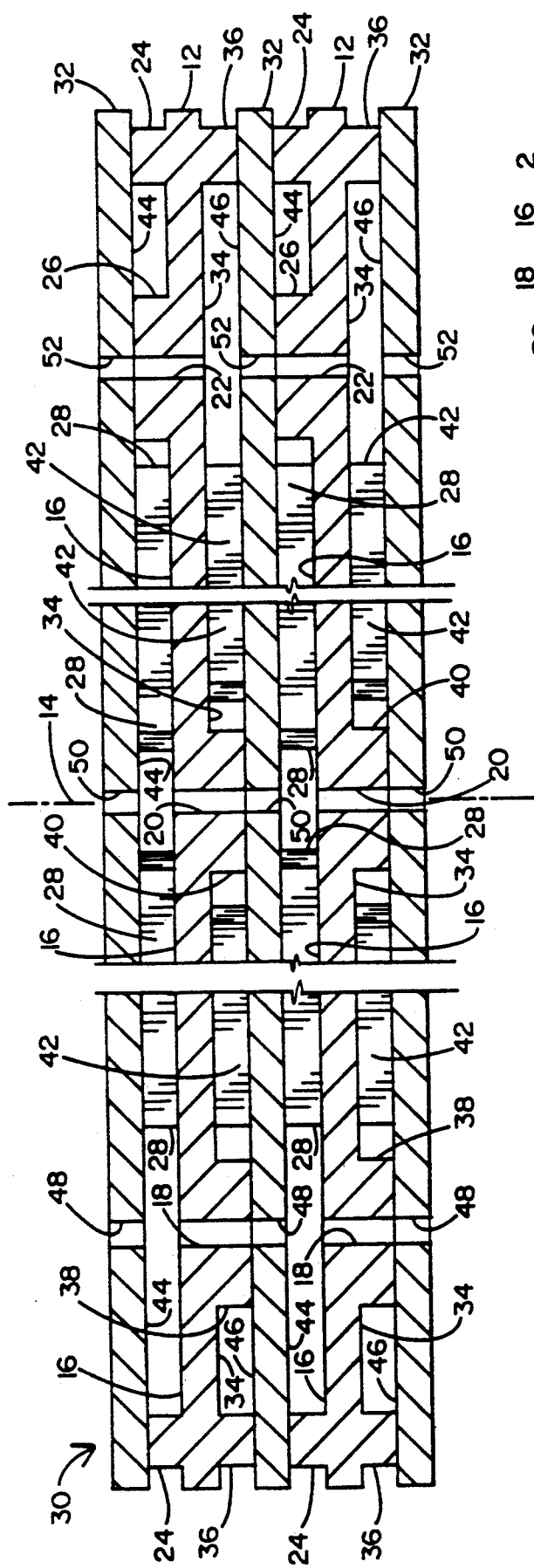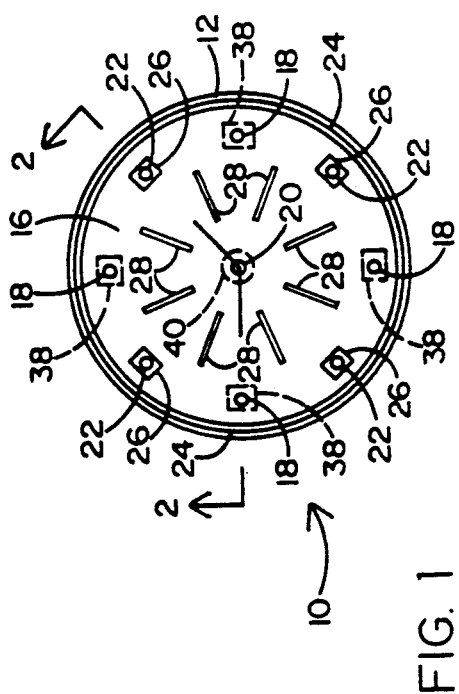
FIG. 1
FIG. 2

CERAMIC DISTRIBUTION MEMBERS FOR SOLID STATE ELECTROLYTE CELLS AND METHOD OF PRODUCING

ORIGIN OF INVENTION

The invention described herein was made in the performance of work under a NASA Contract, and is subject to the provisions of Public Law 96-517 (35 USC 202) in which the Contractor has elected to retain title.

BACKGROUND OF THE INVENTION

This invention pertains to solid state electrolyte cells for use in fluid separation devices and fuel cells. Fluid separation devices and fuel cells utilize solid oxide ceramic materials as ionic electrolytes or membranes for transporting ions of certain substances thereby enabling electrical current to flow through such apparatuses. When such apparatuses are used as fluid separation devices a fluid, for example air, is introduced to one side of the solid ceramic membrane across which an electrical potential has been applied. The oxygen is ionized and oxygen ions are transported through the membrane. On the opposite side of membrane, the oxygen ions recombine to form gaseous oxygen and free electrons. When such apparatuses are used as fuel cells, a fluid reactant, for example hydrogen, is introduced to one side of the solid ceramic membrane and another fluid reactant, for example air or oxygen, is introduced to the other side of the membrane. The oxygen is ionized and oxygen ions are transported through the membrane whereupon the oxygen ions react with the hydrogen forming $H_2O$ and releasing electrons thereby generating an electrical potential and current.

Examples of fluid separation devices utilizing solid ceramic membranes are disclosed in U.S. Pat. No. 4,885,142, which is hereby incorporated herein by reference. This patent discloses several devices for separating oxygen from air in which air distributed at the periphery of a disk of solid ceramic membrane, flows radially inwardly over the disk as oxygen ions are transported through the membrane disk. Air having a reduced oxygen content is removed along the axis of the membrane disk. Stacks of cells are used to improve the separation of oxygen from air. In one stack of cells arrangement, alternating membrane disks and ceramic distribution plates are used. The ceramic distribution plates have radially extending internal ports for distributing air from the periphery of the membrane disk radially inwardly towards the axis. In this arrangement, the electrical current is distributed circumferentially around the edge of the membrane disk by a platinum wire contact ring and electrons flow radially inwardly. Unfortunately, it has been found that the construction of distribution plates having radially extending or horizontal internal ports which are completely internal of the distribution plate is very difficult especially if thin distribution plates are required or desired. In another stack of cells arrangement, the membrane disks are separated by layers of porous packing material made from particles of electrically conductive ceramics such as strontium-doped lanthanum manganite. In this arrangement, electrical current flows axially through the membrane disk. Unfortunately, the layers of packing ceramic material increase the electrical resistance, weight and height of the apparatus which is not desirable.

Methods of producing improved solid ceramic membranes useful for transporting ions are disclosed in U.S. Pat. No. 4,957,673, which is hereby incorporated herein by reference. This patent discloses a method of producing a solid ceramic electrolyte material having a high density electrolyte sandwiched between layers of solid ceramic electrode material having a low density porous structure. One embodiment comprises a sintered central layer of yttria stabilized zirconia ("YSZ") having 95% or more theoretical density and about 8 mole percent yttria, and sintered outer layers of strontiumdoped lanthanum manganite ("LSM") having interconnected porosity and density of 50 to 60% of theoretical with the approximate composition $La_{0.8}Sr_{0.2}MnO_3$. The LSM/YSZ/LSM sandwich structure permits the flow of air through the first layer of porous LSM. Oxygen is then ionized and the oxygen ions are transported through the central YSZ layer. At the other outer layer of porous LSM, oxygen ions recombine and release electrons. The interconnected porous structure of the LSM layers permits the flow of gases to and from the interface of the YSZ-to-LSM layers. The membranes disclosed in U.S. Pat. No. 4,957,673 are especially useful in the cells of the invention described hereinafter.

A distribution plate made from A-lava without radially extending internal ports is disclosed in an article entitled OXYGEN SEPARATION FROM AIR USING ZIRCONIA SOLID ELECTROLYTE MEMBRANES, Proceedings of the 23rd Intersociety Energy Conversion Conference, Vol. 2, ASME, New York, 1988, pp. 273-277. The thickness of the A-lava distribution plates was relatively large compared to the thickness of the membrane disks. Thick distribution plates are a disadvantage if thin electrolyte cells are required or desired. Reference is also made to a ribbed design that contacts the electrode surface for current flow, that provides support for the thin zirconia membrane, and that directs the gas flow from the outer circumference to the center of the disk. The ribbed distribution plates also contained horizontal internal ports for flowing air, oxygen, and oxygen-depleted air in and out of the separation chamber. Unless otherwise specified "horizontal" means parallel to the plane of the member, and "vertical" means perpendicular to the plane of the member. By the term "horizontal internal port" as used herein is meant a port entirely within the member and parallel to the plane of the member.

To minimize the overall height and resistance of apparatuses employing stacks of cells, there is a need to reduce the thickness of all disk members and particularly members containing ribs or horizontal internal ports. Since low temperature electrodes with ribs can be made of metals, the electrodes can be made very thin. However, where the apparatus is required to operate at very high temperatures, as is the case for many separators and fuel cells, such high temperatures are generally beyond the useful temperature range for metals. Although platinum can be used at high temperatures, its cost essentially precludes its use even if applied in only a thin layer. In high temperature cells, both the electrode members and the membrane members are generally made from ceramic materials. Thus, there is a need for a process for producing thin members from ceramic materials.

What is needed is a thin distribution plate made from a solid ceramic electrode material which is suitable for use in an electrolyte cell and which will support an electrolyte membrane in a stack of cells. It is also desirable that the distribution plate provide for parallel porting of fluids to and from the cells and for serial flow of electrical current axially through each cell. Since internal horizontal passageways completely within a distribution plate tend to weaken it and cause it to break or fail at such passageways, it is also desirable that the distribution plate not contain any internal horizontal passageways.

SUMMARY OF THE INVENTION

It is known that zirconia electrolytes will selectively transport oxygen ions at elevated temperatures and that electrolyte cells containing such zirconia electrolytes will separate oxygen from air or other oxygen-containing gases. In such applications, the cell can comprise a three-layer membrane or sandwich, in which an zirconia electrolyte membrane is sandwiched between two porous, electrically conductive ceramic electrodes such as those disclosed in U.S. Pat. No. 4,957,673. In U.S. Pat. No. 4,957,673, the porous electrode material is strontium-doped lanthanum manganite which is an electrically conductive solid ceramic and the zirconia electrolyte membrane is yttria stabilized zirconia. These ceramics form a LSM/YSZ/LSM sandwich or membrane member. When electrical current is supplied to the cell, oxygen is selectively transported through the membrane. In operation, the input gas stream, for example, air, is passed across one side of the cell and pure oxygen is collected from the other side. To avoid contamination of the output oxygen, input gas is prevented from leaking to the output side of the cell and to the atmosphere by seals. In U.S. Pat. No. 4,885,142, the membrane is circular or disk shaped, and the input gas stream is directed radially inward from the rim or periphery of the membrane to the center or axis of the circular sandwich. When an electrical current is applied to the cell, oxygen ions are transported through the membrane. Electrical current is supplied to the membrane by electrodes. In one configuration, the electrodes were platinum wire rings attached to the periphery of the membrane sandwich, and in another configuration, the electrodes were flat plates spaced away from the membranes by an electrically conductive packing material.

Because of the difficulty of fabricating large-diameter ceramic membranes, it is necessary to use multiple cells to increase the oxygen input to practical levels. Electrical considerations dictate that multiple cells be connected in series. The natural configuration for a multiple cell unit is therefore a stack. Configurations of stack of cells are disclosed in U.S. Pat. No. 4,885,142. Gas distribution in a single cell is straightforward and does not present a problem. However, in a multicell stack of cells, gas distribution becomes more difficult because while the electrical connections must be made in series, the gas connections must be made in parallel.

Methods to introduce and remove gas from a stack of cells is disclosed in U.S. Pat. No. 4,885,142 and the aforementioned ASME article. Distribution plates were used to separate the individual cells in the stack and provide the parallel gas and series current connections. The three gas streams, i.e. input air, depleted air, and oxygen, flow through a distribution plate located between membranes. The distribution plates disclosed in these two references required a minimum of three horizontal internal ports inside the body of the distribution plates for the three streams. A relatively large thickness is required for the distribution plates to accommodate the horizontal internal ports. Because of the high operating temperature required for oxygen separation systems, the distribution plates were constructed of LSM and fired to nearly full density so that they would be impervious to gas flow. The LSM distribution plates were constructed by slip casting in plaster molds. Wax inserts were placed into the mold before casting to create the horizontal internal ports. The horizontal internal ports were radially oriented. Unfortunately considerable difficulty was encountered with this method of producing the distribution plates. The fired plates were often cracked. Cracking occurred frequently along the horizontal internal ports. These distribution plates also had a tendency to warp during firing because of their relatively large thickness which was necessary to accommodate the horizontal internal ports. Both the scrap rate and fabrication time per distribution plate for this fabrication method were very high. The relatively large thickness of the distribution plate manufactured by slip casting resulted a stack of cells which required a considerable amount of material, and was physically large and heavy. Because of the aforementioned serious problems, the design of the distribution plates featuring horizontal internal ports and the slip casting method of producing the distribution plates, a need exists for an improved distribution means and method of manufacture.

There is a need, therefore, for a distribution member which does not require horizontal internal ports. It was also desirable to make the distribution member an integral part of either the impervious electrode spacers used to separate the membrane sandwiches, or an integral part of the membrane sandwich, or an integral part of both the impervious electrodes and the electrolyte membrane sandwiches so that either the impervious electrode spacers or the membrane sandwiches or both would serve as means for distributing and directing the flow of the various gas streams.

Non-limiting examples of solid ceramic materials useful for forming electrodes are lanthanum chromates, strontium lanthanum manganites especially strontium-doped lanthanum manganites having an elemental ratio of about $La_{0.8}Sr_{0.2}MnO_3$, and other conductive ceramics.

The above mentioned problems were resolved in this invention by a novel distribution member design and method of producing. To start, thin tapes of LSM were cast by the tape casting method of U.S. Pat. No. 4,957,673 and circular wafers were then cut from the tape. In particular, the ceramic powder was suspended in a plastic binder solution. A tape casting machine was used to cast long, thin tapes, each about four inches wide. After allowing the solvent to evaporate, circular wafers were cut from these tapes in the manner described in U.S. Pat. No. 4,957,673. It was found that the green wafers could be pressed between machined dies that contained a predetermined surface configuration. More particularly, the machined dies were used to embossed a predetermined pattern of ribs and bosses onto the unfired green wafer. The wafers were then fired in the normal manner to produce an impervious LSM disk containing the desired pattern of ribs and bosses. The configuration of the ribbed and bossed LSM disks of this invention eliminated the problems associated with the earlier distribution plates having horizontal internal ports. Elimination of the horizontal internal ports reduced the rate of rejection of distribution members due to cracking and warping.

In this invention, gas streams are introduced and removed from the cells through vertical ports which are parallel to the axis of the cell. Electrical current is supplied to the membrane sandwich by ribs which also direct the gas flow in a desired manner. The ribs can be an integral part of the membrane or LSM/YSZ/LSM sandwich or part of a member which abuts the membrane or LSM/YSZ/LSM sandwich. In one embodiment, the impervious electrode members also serve as the means for distributing and directing the fluid flows. In this invention, gases communicate with the membrane through passageways formed by the ribs and bosses on the surface of the distribution members without the need for horizontal internal ports inside the body of the distribution members. The bosses form seals between the electrode/distribution members and the membrane members and form isolated passageways intended for the streams. Air enters a manifold comprising a plurality of ports nears the periphery of the distribution member. The oxygen-depleted air is vented through a port in the center of the membrane and removed from the cell through a manifold comprising the center port. Oxygen is removed through a manifold comprising another plurality of ports near the periphery of the distribution member.

With the elimination of the horizontal internal ports, the portion of the cell thickness required for distribution and direction of the gases was reduced to less than 10% of the thickness of the earlier mentioned distribution plates of U.S. Pat. No. 4,885,142 and the aforementioned ASME article. This reduction in thickness makes it possible to fabricate the fluid distribution component using a method of tape casting of U.S. Pat. No. 4,957,673 in combination with an embossing procedure of this invention. This tape casting/embossing process is more suitable for mass production than the of slip casting method used in making the distribution plates in U.S. Pat. No. 4,885,142 the aforementioned ASME article. The fabrication process of this invention also allows a much more intricate pattern or ribs and bosses to be created on the distribution member thereby facilitating improved gas-to-surface contact with the membranes and more uniform distribution of electrical current perpendicular to the membrane. These improvements combine to improve overall cell efficiency. It is to be noted that the platinum rings and surface coatings required in the cells of U.S. Pat. No. 4,957,673 and the aforementioned ASME article are not required in this invention.

Accordingly, there is provided by the principles of this invention an apparatus for producing a fluid product from a fluid feedstock comprising a first electrode member having a first surface which is impervious to fluid flow, and a second electrode member having a second surface which is impervious to fluid flow. The apparatus also includes membrane means comprising a solid ceramic electrolyte, located between the first surface of the first electrode member and the second surface of the second electrode member. The solid ceramic electrolyte material is operable for transporting fluid ions therethrough. The membrane means also comprises a first surface on one side thereof and a second surface on the opposite side thereof, the first surface of the membrane means facing the first surface of the first electrode member and the second surface of the membrane means facing the second surface of the second electrode member. The membrane means is designed so that it allows the flow of electrical current from the first electrode member to the membrane means, ionic current through the membrane means and electrical current from the membrane means to the second electrode member while preventing the short circuiting of electrical current around the membrane means.

A plurality of ribs is provided on the first surface of either the membrane means or the first electrode member. The ribs, when abutted against an adjacent member, form passageways sometimes referred to herein as first passageways. A plurality of ribs is also provided on the second surface of either the membrane means or the second electrode member which, when abutted against an adjacent member, also form passageways, sometimes referred to herein as second passageways. The apparatus includes first port means in communication with the first passageways, second port means in communication with the first passageways, and third port means in communication with the second passageways. The first, the second and the third port means extend through the disk shaped member in a direction perpendicular to the first surface.

In one embodiment of this invention, the first and second electrode members and the membrane means are wafer shaped. In another embodiment, the first and second electrode members and the membrane means are disk shaped. In a further embodiment, the first and second electrode members and the membrane means are disk shaped and are concentrically aligned. In still another embodiment, the ratio of the length or diameter of the membrane to the thickness thereof is from about 50 to about 300.

In another embodiment, the first and second electrode members are constructed from electrically conductive solid ceramic material. In a further embodiment, the first and second electrode members are formed by tape casting an electrically conductive solid ceramic material. In yet another embodiment, the membrane means is formed by tape casting.

In one embodiment, the plurality of ribs is provided on the first and second electrode members. In another embodiment, the plurality of ribs is provided on the membrane means. In yet another embodiment, the ribs are on one side only of the membrane means and on one side only of the electrode members.

In still another embodiment, the first and second electrode members and the membrane means are disk shaped, and the ribs on the first surface are radially extended. In yet another embodiment, the first and second electrode members and the membrane means are disk shaped and the ribs on both the first and the second surfaces are radially extended.

In one embodiment, the first and second electrode members and the membrane means are disk shaped and are concentrically aligned, and the first port means is proximate the periphery of the disk shaped members and the second port means is proximate the axis of the disk shaped members. In a further embodiment, the third port means is proximate the axis of the disk shaped members.

In one embodiment of this invention, the first and second electrode members and the membrane means have a thickness from about 0.05 mm to about 1.5 mm. In another embodiment, the ribs are raised from the first surface and the second surface a distance of from about 0.05 mm to about 1.5 mm and have a width of from about 0.05 mm to about 1.5 mm.

The first and second electrode members and the membrane means form a cell. In one embodiment, the apparatus comprises a plurality of cells arranged to form a stack of cells. In another embodiment, at least one of the electrode members in the stack of cells has said first surface on one side thereof and said second surface on the opposite side thereof thereby enabling such member to serves as the first electrode member of one cell and the second electrode member of the adjacent cell in the stack of cells.

In a further embodiment of this invention, there is also provided contact means for maintaining physical and electrical contact between the ribs and the electrode member or membrane means adjacent thereto. When the apparatus is in use, electrical current will flow parallel to the axis of the electrode members. Fluid introduced into the first port means or second port means will flow into the radial first passageways. When used as a separator, fluid ions, having flowed through the membrane means, will flow from the second passageways to the third port means. When used as a fuel cell, reactant flowing into the first port means will flow into the first passageways and fluid ions will flow through the membrane means to the second surface thereof.

In yet another further embodiment, the first or second port means is connected to means for introducing fluid feedstock into the first passageways, and the other one of the first or second port means is connected to means for removing spent feedstock from the first passageways. In a separator embodiment, the third port means is connected to means for removing fluid product separated by the membrane means. In a fuel cell embodiment, the first or second port means is connected to means for introducing fluid feedstock into the first passageways for ionizing and transport through the membrane means for reaction with fluid in the second passageways.

There is also provided by the principles of this invention a disk shaped member for a cell comprising a main body portion having a first surface on one side and a second surface on the opposite side, and having a peripheral boss extending perpendicularly from the first surface for forming a seal around the perimeter of the first surface. The disk shaped member also comprises a first port extending through the disk shaped member from the first surface to the second surface, a second port extending through the disk shaped member from the first surface to the second surface, and a third port extending through the disk shaped member from the first surface to the second surface, the first, second and third ports being spaced away from each other and radially inward of the peripheral boss. The disk shaped member also has a boss, sometimes referred to herein as the third port boss, extending perpendicularly from the first surface and forming a seal around the third port on the first surface, and a plurality of ribs extending perpendicularly from the first surface, the plurality of ribs for forming passageways on the first surface. In one embodiment, the first port is proximate the peripheral boss. In another embodiment, the second port is proximate the axis of the disk shaped member. In still another embodiment, the ribs are radially extending from proximate the second port to proximate the peripheral boss and form radially extending passageways on the first surface. In one embodiment, the third port is proximate the peripheral boss. In another embodiment, the disk shaped member has a second port boss extending perpendicularly from the first surface and proximate the second port for forming a seal around the second port on the first surface.

In one embodiment, the disk shaped member further comprises a first peripheral boss extending perpendicularly from the first surface for forming a seal around the perimeter of the first surface, and a second peripheral boss extending perpendicularly from the second surface for forming a seal around the perimeter of the second surface. The disk shaped member also has a first port extending through the disk shaped member from the first surface to the second surface, a second port extending through the disk shaped member from the first surface to the second surface, and a third port extending through the disk shaped member from the first surface to the second surface, the first, second and third ports being spaced away from each other and inward of the first peripheral boss and second peripheral boss. In addition to the third port boss, in this embodiment, the disk shaped member also has a second port boss extending perpendicularly from the second surface and proximate the second port for forming a seal around the second port on the second surface, and a first port boss extending perpendicularly from the second surface for forming a seal around the first port on the second surface. When the member is abutted against an adjacent member in the formation of a cell, the ports are isolated from the surface containing their bosses.

In addition to the ribs on the first surface, in this embodiment, the disk shaped member further comprises a plurality of ribs extending perpendicularly from the second surface. When the rib-containing member is abutted between adjacent members in the formation of a cell, the plurality of ribs form first passageways on the first surface, and second passageways on the second surface. The ribs also serve as structural support and spacers between members. In another embodiment the plurality of ribs on the first and/or second surface radially extend from proximate the axis to proximate the peripheral boss and form radially extending passageways on the surface. In one embodiment, the disk shaped member is an electrode and the first and second surfaces thereon are impervious to fluid flow. In another electrode embodiment, the disk shaped member is formed from a solid ceramic material that is electrically conductive and the first and second surfaces are made impervious to fluid flow. In one embodiment, the surfaces are made impervious to fluid flow by forming the electrode members from a high density tape.

In another embodiment, the disk shaped member comprises a solid ceramic material that is operable as a membrane material, and the first and second surfaces are pervious to fluid product ion flow.

In another embodiment, the disk shaped member has a thickness from about 0.05 mm to about 1.5 mm, the bosses and the ribs extend from the first surface and the second surface a distance of from about 0.05 mm to about 1.5 mm, the ribs have a width of from about 0.05 mm to about 1.5 mm, and the bosses have a width of at least about 0.05 mm.

There is also provided by the principles of this invention a method for forming a ribbed member for a cell comprising tape casting a slip from a slurry of particulate solid ceramic material thereby forming a green tape, embossing a plurality of ribs arranged in a predetermined pattern on the green tape thereby forming an embossed green tape, and firing the embossed green tape to form a ribbed member for a cell. In one embodiment, the embossing is performed on one side of the green tape, and in another embodiment, the embossing is performed on both sides of the green tape. In still another embodiment, the member is cut from the green tape so that the member has a disk shape and the ribs are embossed on the green disk shaped member so that the ribs are radially extended. In yet another embodiment, the ribs are embossed on one side only of the membrane means and embossed on one side only of the electrode members. In a still further embodiment, the ribs are embossed so that after firing the ribs have a height of from about 0.05 mm to about 1.5 mm and a width of from about 0.05 mm to about 1.5 mm. In another embodiment, the bosses are embossed so that after firing the bosses have a height of from about 0.05 mm to about 1.5 mm and a width of at least about 0.05 mm.

In one embodiment, the particulate solid ceramic material is, when fired, an electrically conductive ceramic, and the ribbed member formed serves as an electrode member in a cell. In another embodiment, the particulate solid ceramic material is operable, when fired, for transporting fluid ions, and the ribbed member formed serves as a membrane member in a cell.

BRIEF DESCRIPTION OF THE DRAWINGS

FIG. 1 is a top view of a ribbed disk shaped member.

FIG. 2 is an enlarged cross-sectional view of a portion of a stack of cells taken in the direction of line 2—2 of FIG. 1.

DESCRIPTION OF THE PREFERRED EMBODIMENTS

Figure 3:
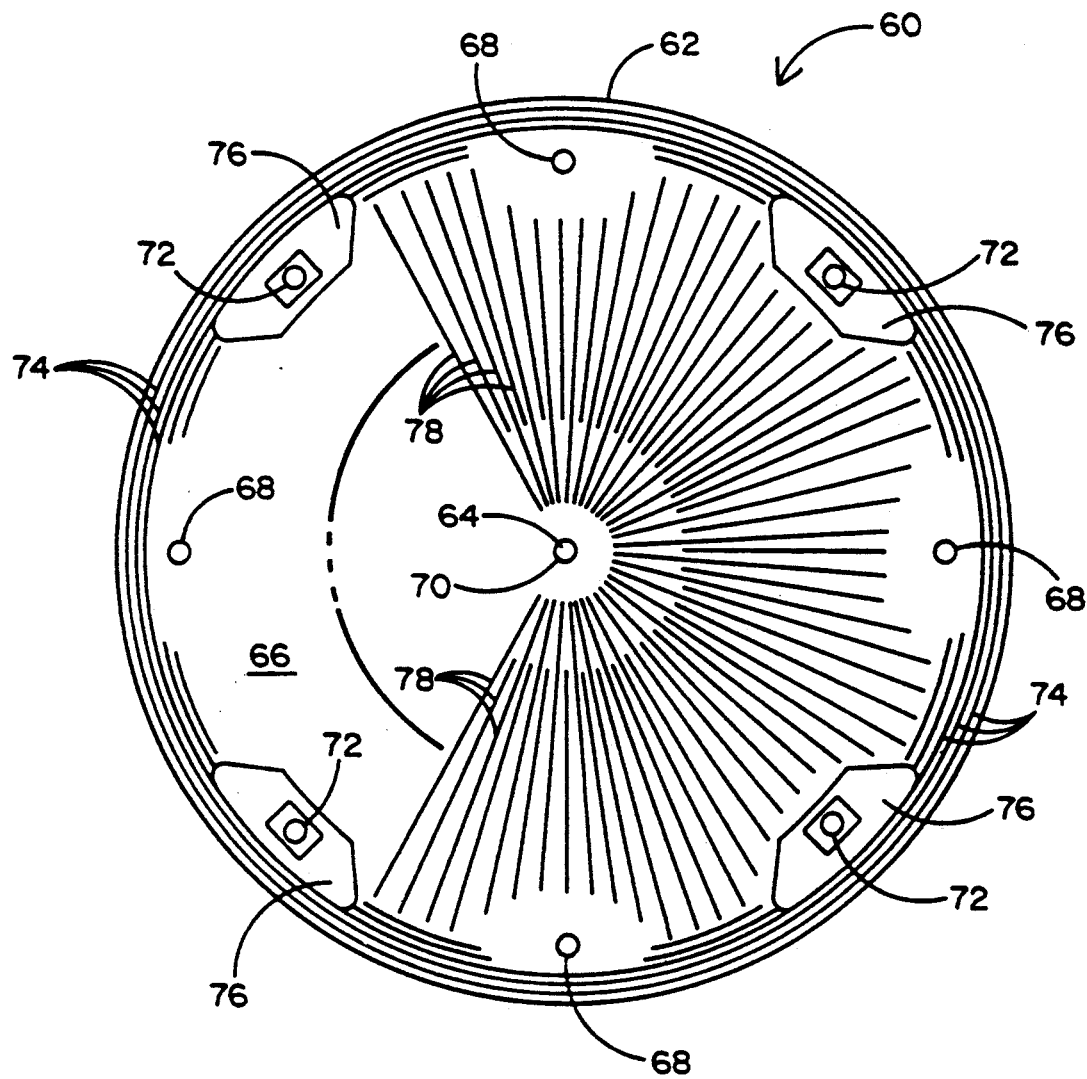
FIG. 3 is a top view of another ribbed disk shaped member.

FIGS. 1 and 2 illustrate the principles of this invention adapted to a ribbed disk shaped member generally designated by numeral 10. FIG. 1 is a top view of the ribbed disk shaped member 10 having main body portion 12, axis 14 (shown in FIG. 2), radially extending top surface 16 sometimes referred to herein as the first surface, four peripheral ports 18 sometimes referred to herein as the first ports, a central port 20 sometimes referred to herein as the second port, and four peripheral ports 22 sometimes referred to herein as the third ports. Top surface 16 also comprises upper peripheral boss 24 which, when assembled as a cell as shown in FIG. 2, acts as a seal isolating the top surface therewithin. Each third port has a boss 26, sometimes referred to herein as the third port boss, which surrounds the third port and, when assembled as a cell, acts as a seal isolating the third port therewithin. Top surface 16 also comprises a plurality of radially extending upper ribs 28. FIGS. 1 and 2 show that upper peripheral boss 24 encloses the first, second and third ports and the upper ribs.

FIG. 2 is an enlarged cross-sectional view of a portion of a stack of cells, generally designated by numeral 30, taken in the direction of line 2—2 of FIG. 1. The stack of cells 30 comprises ribbed disk shaped members 10 and flat plate members 32 stacked concentrically to axis 14 in alternating order. As seen in FIG. 2, each ribbed disk shaped member 10 is aligned along axis 14 and has first surface 16 and bottom surface 34 sometimes referred to herein as the second surface. Ports 18, 20 and 22 extend axially through member 10.

First surface 16 comprises upper peripheral boss 24, third port bosses 26, and upper radially extending ribs 28. Second surface 34 comprises lower peripheral boss 36 which, when assembled as a cell, acts as a seal isolating the lower surface therewithin. Second surface 34 also comprises bosses 38, sometimes referred to herein as the first port boss, which surrounds each of first ports 18 and, when assembled as a cell, acts as a seal isolating each of the first ports therewithin. Second surface 34 also has a boss 40, sometimes referred to herein as the central or second port boss, which surrounds the second port and, when assembled as a cell, acts as a seal isolating the second port therewithin. Second surface 34, therefore, comprises lower peripheral boss 36, first port bosses 38, second port boss 40, and radially extending lower ribs 42.

FIG. 2 shows that each ribbed disk shaped member 10 has four parallel planes, namely the plane of the first surface 16, the plane of the second surface 34, the plane of the raised surface of the upper peripheral boss 24, and the plane of the raised surface of the lower peripheral boss 36. The plane of the raised surface of the upper peripheral boss 24 also includes the raised surfaces of the upper ribs 28 and the third port bosses 26. The plane of the raised surface of the lower peripheral boss 36 also includes the raised surfaces of the lower ribs 42, the first port bosses 38, and the second port boss 40.

As shown in FIG. 2, ribbed disk shaped members 10 are abutted between flat plate members 32. Each flat plate member 32 has a first surface 44 and a second surface 46 such that, when assembled as a cell, the first surface 44 faces the first surface 16 of ribbed disk shaped member 10, and, the second surface 46 faces the second surface 34 of member 10. Each flat plate member also comprises four peripheral ports 48 which are in axial alignment with the four ports 18 of member 10, respectively, a central port 50 which is in axial alignment with port 20, and four peripheral ports 52 which are in axial alignment with the four ports 22, respectively.

Referring to FIG. 2, it can be seen that the four first ports 48 of flat plate members 32 and the four first ports 18 of ribbed disk shaped members 10 are in fluid communication with each other; that the second ports 50 of flat plate members 32 and the second ports 20 of ribbed disk shaped members 10 are in fluid communication with each other; and, that the four third ports 52 of flat plate members 32 and the four third ports 22 of ribbed disk shaped members 10 are in fluid communication with each other. It can also be seen that the upper ribs 28 form radial passageways between first surfaces 44 of flat plate members and first surfaces 16 of ribbed disk shaped members 10; and, that lower ribs 42 form radial passageways between second surfaces 34 of member 10 and second surfaces 46 of flat plate members 32.

If the apparatus is operated as a separator then fluid feedstock entering the manifold formed by ports 48 of flat plate members 32 and ports 18 of ribbed member 10 will flow radially between first surfaces 16 and 44 towards axis 14 and exit through the manifold formed by ports 50 of flat plate members 32 and ports 20 of ribbed members 10. If either members 10 or 32 are pervious to ion flow of a component of the fluid feedstock, then such component ions will flow through such pervious members and into the radial passageways formed by lower ribs 42. The separated product can be removed from the apparatus through the manifold formed by third ports 52 in flat plate members 32 and ports 22 in ribbed member 10.

Similarly, if the apparatus is operated as a fuel cell, then a first fluid feedstock entering the manifold formed by ports 18 and 48, or alternatively the manifold formed by ports 20 and 50, of members 10 and 32, respectively, will flow radially between first surfaces 16 and 44. If either members 10 or 32 are pervious to ion flow of the first fluid feedstock, then such first fluid feedstock ions will flow through first surfaces 44 or 16 and through such pervious members whereupon the first fluid feedstock can react in the passageways formed by the lower ribs 42 with a second fluid feedstock introduced into the manifold formed by one half of ports 22 and 52, for example ports 22 appearing at the top-left and bottom-right of FIG. 1. The resulting reaction product and excess second fluid feedstock is removed through the manifold formed by the other half of ports 22 and 52, for example ports 22 appearing at the top-right and bottom-left of FIG. 1. The excess first fluid feedstock is removed from the apparatus through the manifold formed by ports 20 and 50, or alternatively ports 18 and 48.

FIGS. 1 and 2 show the general features of the ribbed disk shaped member 10 used in stack of cells 30 and how the various streams are introduced and removed from the apparatus when it is used as a separator or as a fuel cell. It is to be understood that either ribbed disk shaped member 10 or flat plate members 32 will be pervious to ion flow.

In an alternative embodiment rather than disk shaped member 10 having ribs on both of its surfaces 16 and 34 and flat plate members 32 having no ribs on either of its surfaces 44 and 46, each of such members can have ribs on one surface only. For example, instead of first surface 16 of disk shaped members 10 having peripheral boss 24, third port boss 26 and ribs 28, these elements can instead be made an integral part of first surface 44 of members 32 which then abut a radially extending flat first surface of member 10. In another alternative embodiment, bosses 36, 38 and 40 and ribs 42 can be made an integral part of the second surface of member 32 rather than a part of member 10.

Figure 4:
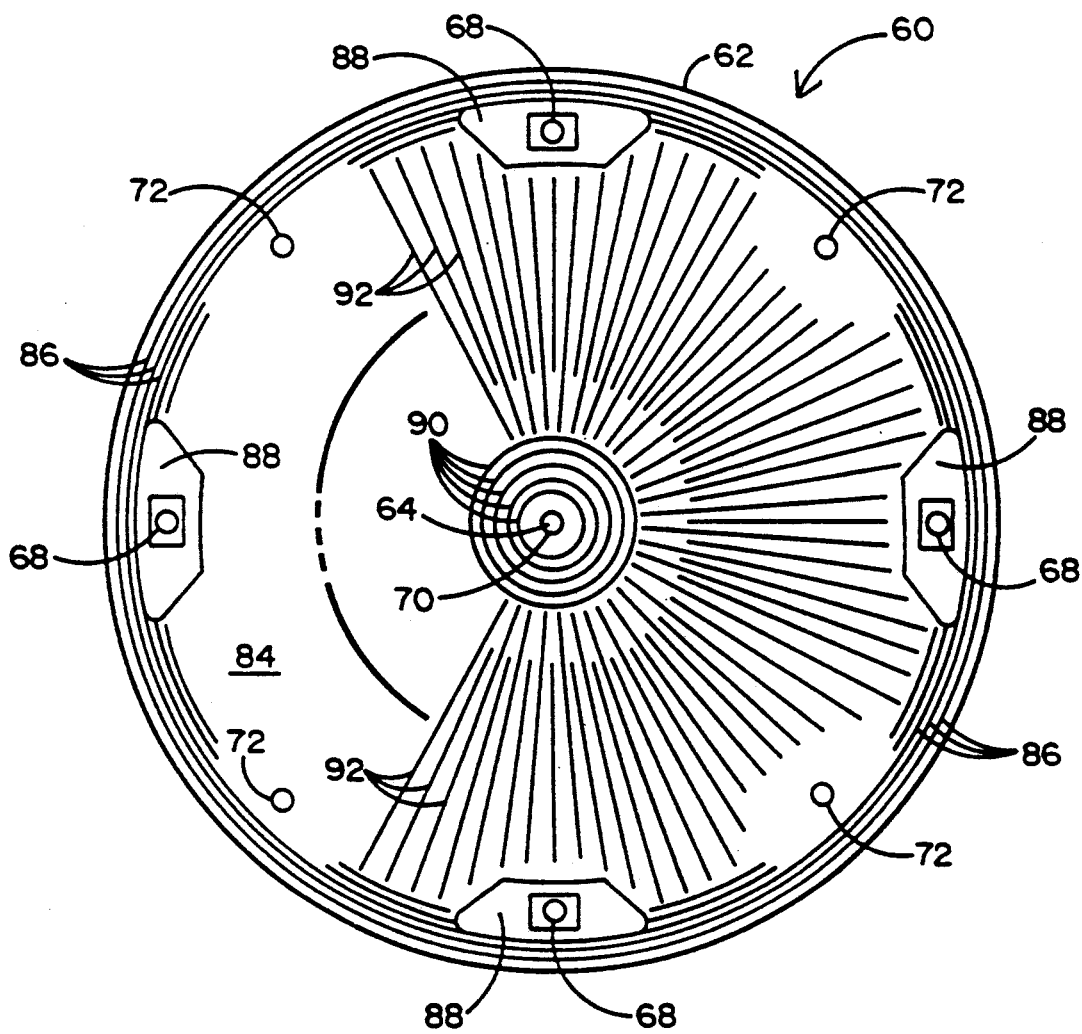
FIG. 4 is a bottom view of the ribbed disk shaped member of FIG. 3.

A preferred embodiment of a ribbed disk shaped member generally designated by numeral 60 is illustrated in FIGS. 3 and 4. FIG. 3 is a top view of ribbed disk shaped member 60 having main body portion 62, axis 64, radially extending top surface 66 sometimes referred to herein as the first surface, four peripheral ports 68 sometimes referred to herein as the first ports, a central port 70 sometimes referred to herein as the second port, and four peripheral ports 72 sometimes referred to herein as the third ports. Top surface 66 also comprises a plurality of upper peripheral bosses 74 which, when assembled as a cell similar to that shown in FIG. 2, acts as a seal isolating the top surface therewithin. Each third port has a boss 76, sometimes referred to herein as the third port boss, which surrounds the third port and, when assembled as a cell, acts as a seal isolating the third port therewithin. Top surface 66 also comprises a plurality of radially extending upper ribs 78. FIG. 3 shows that upper peripheral boss 74 encloses the first, second and third ports and the upper ribs.

FIG. 4 is a bottom view of the ribbed disk shaped member 60 having radially extending bottom surface 84 sometimes referred to herein as the second surface, the four first ports 68, the central or second port 70, and the four third ports 72.

First surface 66 comprises upper peripheral bosses 74, third port bosses 76, and upper radially extending ribs 78. Second surface 84 comprises a plurality of lower peripheral bosses 86 which, when assembled as a cell, acts as a seal isolating the lower surface therewithin. Second surface 84 also comprises bosses 88, sometimes referred to herein as the first port bosses, which surround each of first ports 68 and, when assembled as a cell, acts as a seal isolating each of the first ports therewithin. Second surface 84 also has a plurality of bosses 90, sometimes referred to herein as the central or second port bosses, which surrounds the second port and, when assembled as a cell, acts as a seal isolating the second port therewithin. Second surface 84, therefore, comprises lower peripheral bosses 86, first port bosses 88, second port bosses 90, and radially extending lower ribs 92.

Each ribbed disk shaped member 60 has four parallel planes, namely the plane of the first surface 66, the plane of the second surface 84, the plane of the raised surface of the upper peripheral bosses 74, and the plane of the raised surface of the lower peripheral bosses 86. The plane of the raised surface of the upper peripheral bosses 74 also includes the raised surfaces of the upper ribs 78 and the third port bosses 76. The plane of the raised surface of the lower peripheral bosses 86 also includes the raised surfaces of the lower ribs 92, the first port bosses 88, and the second port bosses 90.

Similar to that shown in FIG. 2 for members 10 and 32, ribbed disk shaped members 60 are abutted between flat plate members 32. Each flat plate member 32 having first surface 44 and second surface 46, whereupon when assembled as a cell with ribbed disk shaped member 60, the first surface 44 of member 32 faces the first surface 66 of member 60, and, the second surface 46 of member 32 faces the second surface 84 of member 60. Ports 48 are in axial alignment with ports 68 of member 60, central port 50 is in axial alignment with port 70, and ports 52 are in axial alignment with the ports 72.

The four ports 48 of flat plate members 32 and the four ports 68 of ribbed disk shaped members 60 are in fluid communication with each other. The second ports 50 of members 32 and the second ports 70 of members 60 are in fluid communication with each other. The four ports 52 of members 32 and the four ports 72 of members 60 are in fluid communication with each other. Upper ribs 78 form radial passageways between first surfaces 44 of members 32 and first surfaces 66 of members 60, and, lower ribs 92 form radial passageways between second surfaces 84 of member 60 and second surfaces 46 of flat plate members 32.

In one embodiment, the thickness of the impervious electrode members is about 0.1 mm. In one embodiment, the thickness of the membrane sandwich is about 0.1 mm. In one embodiment, the diameters of the impervious electrode members and the membrane sandwich are about 7 cm.

In one embodiment, the height and width of the radial ribs 78 and 92, peripheral bosses 74 and 86, and second port bosses 90 are from about 0.1 mm to about 0.5 mm.

In one embodiment, the diameters of the ports 68, 70 and 72 are from about 1 mm to about 3 mm.

If the apparatus is operated as a separator, then fluid feedstock entering the manifold formed by ports 48 and 68 of members 32 and 60 will flow radially between first surfaces 66 and 44 and exit through the manifold formed by ports 50 and 70 of members 32 and 60. If either members 60 or 32 are pervious to ion flow of a component of the fluid feedstock, then such component ions will flow through such pervious members and into the radial passageways formed by lower ribs 92. The separated product can be removed from the apparatus through the manifold formed by ports 52 and 72.

Similarly, if the apparatus is operated as a fuel cell, then a first fluid feedstock entering the manifold formed by ports 68 and 48, or alternatively the manifold formed by ports 70 and 50, of members 60 and 32, respectively, will flow radially between first surfaces 66 and 44. If either members 60 or 32 are pervious to ion flow of the first fluid feedstock, then such first fluid feedstock ions will flow through first surfaces 66 or 44 and through such pervious members whereupon the first fluid feedstock can react in the passageways formed by the lower ribs 92 with a second fluid feedstock introduced into the manifold formed by one half of ports 72 and 52, for example ports 72 appearing at the top-left and bottom-right of FIG. 3. The resulting reaction product and excess second fluid feedstock is removed through the manifold formed by the other half of ports 72 and 52, for example the ports 72 appearing at the top-right and bottom-left of FIG. 3. The excess first fluid feedstock is removed from the apparatus through the manifold formed by ports 70 and 50, or alternatively ports 68 and 48. It is to be understood that one or the other of ribbed disk shaped member 60 or flat plate members 32 will be pervious to ion flow. It should be understood also that when operated as a fuel cell lower ribs 92 would not necessarily be radially extending.

In an alternative embodiment rather than disk shaped member 60 having ribs on both of its surfaces 66 and 84 and flat plate members 32 having no ribs on either of its surfaces 44 and 46, each of such members can have ribs on one surface only. For example, instead of first surface 66 of disk shaped members 60 having peripheral bosses 74, third port bosses 76 and ribs 78, these elements can instead be made an integral part of first surface 44 of members 32 which then abut a radially extending flat first surface of member 60. In another alternative embodiment, bosses 86, 88 and 90 and ribs 92 can be made an integral part of the second surface of member 32 rather than a part of member 60 whereupon assembly will then abut a radially extending flat second surface of member 60.

In one embodiment, ribbed disk shaped members 10 and 60 are electrodes made from an impervious material which is operable for use as an electrode, and flat plate members 32 comprise solid ceramic electrolyte material which is operable for transporting therethrough ions of a fluid feedstock. In another embodiment, flat plate members 32 are electrodes made from an impervious material which is operable for use as an electrode, and ribbed disk shaped members 10 or 60 comprise solid ceramic electrolyte material which is operable for transporting therethrough ions of a fluid feedstock.

It is to be understood that FIG. 2 represent only a portion of a stack of cells. It should also be understood that in most embodiments a complete stack of cells will have between about 5 and about 100, or more, cells with the electrical current flow in series through the cells and the fluid flow in parallel through the cells. Arrangements of stack of cells and electrical connections thereto are disclosed in U.S. Pat. No. 4,885,142.

This invention allows the thickness of flat plate members 32 and particularly ribbed and bossed members 10 and 60 to be reduced which in turn allows the overall height of apparatuses and electrical resistance of stacks of cells to be reduced.

EXAMPLE NO. 1

The following is an example, based partly on experimental data and partly on calculated values extrapolated to a 3 SLPM (standard liters per minute) oxygen output unit, of an embodiment of the apparatus of this invention used as a separator for separating oxygen from air using a LSM impervious electrode having ribs and bosses and a pervious integral LSM/YSZ/LSM membrane as the flat plate member. U.S. Pat. No. 4,957,673 discloses such pervious integral LSM/YSZ/LSM membranes and how to produce them.

An oxygen separation apparatus having a cell diameter of 5.7 cm, 67 cells in a stack, with a stack operating temperature of 1000° C., air or feedstock input of 30 SLPM, a stack power consumption of 481 W (12.9 A times 37.3 volts), heat loss to the environment of 665 W, and heater power consumption of 219 W, will produce 3 SLPM of oxygen and 27 SLPM of oxygen-depleted feedstock. A heat exchanger could be used to recover the heat lost to the environment thereby eliminating the 219 W heater.

EXAMPLE NO. 2

The following is an example, based partly on published experimental data of others and partly on calculated values, of one embodiment of the apparatus of this invention used as a fuel cell for reacting hydrogen and air and producing steam and electrical current using a LSM impervious electrode having ribs, ports and bosses and a pervious integral LSM/YSZ/LSM membrane as the flat plate member.

The fuel cell has a cell diameter of 5.7 cm, 67 cells in a stack, resulting in a stack volume of 600 cm$^3$, with a stack operating temperature of 1000° C., air input of 54 SLPM, hydrogen input of 5.1 SLPM, a stack power output of 385 W (7.7 A times 50 volts) which corresponds to a power density of 0.644 W/cm$^3$, a steam and excess hydrogen output of 50 mg/s, and excess air output of 52 SLPM.

Distribution members were successfully fabricated by the principles of this invention. The fired components were produced with good rib and boss definition that exhibited no evidence of cracking, wrinkling, or warping.

Since plaster molds required for the slip casting method are not used in the process of this invention, the labor required per distribution member was greatly reduced. Less ceramic material was used, enabling a smaller, lighter stack of cells to be made. The reduction of size and weight of the stack allows the thinner distribution members to take advantage of the self-heating effect of the oxygen separation process, which improves the energy efficiency of the system.

In this invention, the creation of passageways on the surface of the membrane means by ribs and the isolation of those passageways with bosses also on the surface of the membrane means, eliminated the need for horizontal internal ports. The elimination of the horizontal internal ports allows thinner distribution members to be made by the tape casting method as opposed to the more labor intensive slip casting method. The discovery that ribs and bosses could be embossed on green tapes prior to firing and that the ribs and bosses would be well defined on the fired component greatly increased distribution member fabrication rates and lowered the rejection rate.

In general, the embossing method of this invention allows a larger number, and more intricate pattern, of ribs and bosses to be formed on the distributing member thereby improving the electrical contact between the distribution member and the membrane sandwich and the fluid-to-surface contact on the membrane member. The improved electrical contact between impervious electrode members and membrane sandwich members reduces the resistance and the power required for the cell to operate, which in turn improves the efficiency of the apparatus. It should be noted, however, that the embossing process of this invention can be applied to the three-layer LSM/YSZ/LSM sandwich, to the impervious electrode member of the cell, to both the membrane sandwich and the impervious electrode member, or, if desired, to any other type of distribution members used in cells. If the embossing is applied to the three-layer LSM/YSZ/LSM sandwich, it is preferably applied to the outer porous LSM layers and the YSZ layer remains entirely within the main body portions 12 and 62.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore, it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. An apparatus for producing a fluid product from a fluid feedstock comprising:
    a first electrode member having a first surface which is impervious to fluid flow;
    a second electrode member having a second surface which is impervious to fluid flow;
    membrane means, which comprises a solid ceramic electrolyte, located between the first surface of the first electrode member and the second surface of the second electrode member, the membrane means having a first surface on one side thereof and a second surface on the opposite side thereof, the first surface of the membrane means facing the first surface of the first electrode member and the second surface of the membrane means facing the second surface of the second electrode member, the distance between the first surface of the membrane means and the second surface of the membrane means being much smaller than the distances across the first surface and the second surface of the membrane means, the membrane means being operable for transporting fluid ions therethrough, the membrane means for allowing the flow of electrical current from the first electrode member to the membrane means, ionic current through the membrane means and electrical current from the membrane means to the second electrode member while preventing the short circuiting of electrical current around the membrane means;
    a plurality of ribs on the first surface of either the membrane means or the first electrode member which form first passageways between said first surfaces;
    a plurality of ribs on the second surface of either the membrane means or the second electrode member which form second passageways between said second surfaces;
    first port means in communication with the first passageways;
    second port means in communication with the first passageways; and,
    third port means in communication with the second passageways, wherein the first port means, the second port means, and the third port means extend through the first electrode member, the second electrode member and the membrane means in a direction perpendicular to the first surface.

2. The apparatus of claim 1, wherein the first and second electrode members and the membrane means are wafer shaped.

3. The apparatus of claim 1, wherein the first and second electrode members and the membrane means are disk shaped.

4. The apparatus of claim 1, wherein the first and second electrode members and the membrane means are disk shaped and are concentrically aligned.

5. The apparatus of claim 1, wherein the first and second electrode members are a solid ceramic material.

6. The apparatus of claim 1, wherein the first and second electrode members are a solid ceramic material and are formed by tape casting.

7. The apparatus of claim 1, wherein the membrane means is formed by tape casting.

8. The apparatus of claim 1, wherein the plurality of ribs are on the first and second electrode members.

9. The apparatus of claim 1, wherein the plurality of ribs are on the membrane means.

10. The apparatus of claim 1, wherein the first and second electrode members and the membrane means have a thickness from about 0.05 mm to about 1.5 mm.

11. The apparatus of claim 1, wherein the ribs are raised from the first surface and the second surface a distance of from about 0.05 mm to about 1.5 mm and have a width of from about 0.05 mm to about 1.5 mm.

12. The apparatus of claim 1, wherein the first and second electrode members and the membrane means are disk shaped and the ribs on the first surface are radially extended.

13. The apparatus of claim 1, wherein the first and second electrode members and the membrane means are disk shaped and the ribs are radially extended.

14. The apparatus of claim 1, wherein the first and second electrode members and the membrane means are disk shaped and are concentrically aligned, and wherein the first port means is proximate the periphery of the first electrode member, the second electrode member and the membrane means and the second port means is proximate the axis of the first electrode member, the second electrode member and the membrane means.

15. The apparatus of claim 1, wherein the first and second electrode members and the membrane means are disk shaped and are concentrically aligned, and wherein the third port means is proximate the axis of the first electrode member, the second electrode member and the membrane means.

16. The apparatus of claim 1, wherein the first and second electrode members and the membrane means form a cell, and
further comprising a plurality of cells arranged to form a stack of cells.

17. The apparatus of claim 16, wherein at least one of the electrode members has the first surface on one side thereof and the second surface on the opposite side thereof so it serves as the first electrode member of one cell and the second electrode member of the adjacent cell in the stack of cells.

18. The apparatus of claim 1, further comprising means connected to the first port means, for introducing fluid into the first passageways;
means connected to the second port means, for removing fluid from the first passageways; and,
means is connected to the third port means, for removing fluid produced by the membrane means from the second passageways.

19. The apparatus of claim 1, further comprising first means connected to the first port means, for introducing fluid into, or removing fluid from, the first passageways;
second means connected to the second port means, for introducing fluid into, or removing fluid from, the first passageways;
means connected to the third port means, for introducing fluid into the second passageways;
fourth port means in communication with the second passageways; and
means connected to the fourth port means, for removing fluid from the second passageways.

20. The apparatus of claim 1, further comprising:
a first peripheral boss on the first surface of either the membrane means or the first electrode member which extends perpendicularly therefrom for forming a seal around the perimeter of the first surface; and,
a second peripheral boss on the second surface of either the membrane means or the second electrode member which extends perpendicularly therefrom for forming a seal around the perimeter of the second surface, the first and third ports being radially inward of the first peripheral boss and second peripheral boss.

21. The apparatus of claim 1, wherein the ribs were formed by an embossing process.

22. An apparatus for producing fluid product from a fluid feedstock comprising:
a disk shaped first electrode member of solid ceramic material having a radially extended first surface which is impervious to fluid flow;
a disk shaped second electrode member of solid ceramic material having a radially extended second surface which is impervious to fluid flow;
disk shaped membrane means, which comprises a solid ceramic electrolyte, located concentrically between the first surface of the first electrode member and the second surface of the second electrode member, the membrane means having a radially extended first surface on one side thereof and a radially extended second surface on the opposite side thereof, the first surface of the membrane means facing the first surface of the first electrode member and the second surface of the membrane means facing the second surface of the second electrode member, the membrane means being operable for transporting fluid ions axially therethrough, the membrane means for allowing the flow of electrical current from the first electrode member to the membrane means, ionic current through the membrane means and electrical current from the membrane means to the second electrode member while preventing the short circuiting of electrical current from the first electrode member to the second electrode member around the membrane means;
a plurality of radially extended and axially raised ribs on the first surface of either the membrane means or the first electrode member which, when the first surface side of the membrane means is abutted the first surface side of the first electrode member, form radial first passageways between said first surfaces;
a plurality of axially raised ribs on the second surface of either the membrane means or the second electrode member which, when the second surface side of the membrane means is abutted the second surface side of the second electrode member, form second passageways between said second surfaces;
first port means in communication with the radial first passageways;
second port means in communication with the radial first passageways; and,
third port means in communication with the second passageways, wherein the first port means, the second port means, and the third port means extend through the first electrode member, the second electrode member, and the membrane means in a direction perpendicular to the first surface.

23. The apparatus of claim 22, wherein the ribs on the second surface are radially extended.

24. The apparatus of claim 22, wherein the third port means is proximate the periphery of the disk shaped members.

25. The apparatus of claim 22, wherein the ribs were formed by an embossing process.

26. An apparatus for producing fluid product from a fluid feedstock comprising:
a disk shaped first electrode member of solid ceramic material having a radially extended first surface which is impervious to fluid flow;
a disk shaped second electrode member of solid ceramic material having a radially extended second surface which is impervious to fluid flow;
disk shaped membrane means, which comprises a solid ceramic electrolyte, located concentrically between the first surface of the first electrode member and the second surface of the second electrode member, the membrane means having a radially extended first surface on one side thereof and a radially extended second surface on the opposite side thereof, the first surface of the membrane means facing the first surface of the first electrode member and the second surface of the membrane means facing the second surface of the second electrode member, the membrane means being operable for transporting fluid ions axially therethrough, the membrane means for allowing the flow of electrical current from the first electrode member to the membrane means, ionic current through the membrane means and electrical current from the membrane means to the second electrode member while preventing the short circuiting of electrical current around the membrane means;
a plurality of radially extended and axially raised ribs on the first surface of either the membrane means or the first electrode member which, when the first surface side of the membrane means is abutted the first surface side of the first electrode member, form radial first passageways between said first surfaces;

a plurality of axially raised ribs on the second surface of either the membrane means or the second electrode member which, when the second surface side of the membrane means is abutted the second surface side of the second electrode member, form second passageways between said second surfaces;

first port means proximate the periphery of the disk shaped members in communication with the radial first passageways;

second port means proximate the axis of the disk shaped members in communication with the radial first passageways;

third port means in communication with the second passageways, wherein the first port means, the second port means, and the third port means extend through the first electrode member, the second electrode member, and the membrane means in a direction perpendicular to the first surface; and, contact means for maintaining physical and electrical contact between the ribs and the electrode member or membrane means adjacent thereto so that, when the apparatus is in use, electrical current will flow through the apparatus in a direction parallel to the axis of the electrode members.

27. The apparatus of claim 26, wherein the third port means is proximate the periphery of the disk shaped members.

28. The apparatus of claim 26, wherein the ribs on the second surface are radially extended.

29. The apparatus of claim 26, wherein the ribs were formed by an embossing process.

30. A disk shaped member for a cell comprising:
(a) a main body portion having a first surface on one side and a second surface on the opposite side, the distance between the first surface and the second surface being much smaller than the distances across the first surface and the second surface;
(b) a peripheral boss extending perpendicularly from the first surface for forming a seal around the perimeter of the first surface;
(c) a first port extending through the disk shaped member from the first surface to the second surface;
(d) a second port extending through the disk shaped member from the first surface to the second surface;
(e) a third port extending through the disk shaped member from the first surface to the second surface, the first, second and third port being spaced away from each other and radialy inward of the peripheral boss, wherein the first port, the second port, and the third port extend through the first surface and the second surface in a direction perpendicular to the first and second surfaces;
(f) a third port boss extending perpendicularly from the first surface and forming a seal around the third port on the first surface; and,
(g) a plurality of ribs extending perpendicularly from the first surface for forming passageways on the first surface.

31. A disk shaped member for a cell comprising:
(a) a main body portion having a first surface on one side and a second surface on the opposite side, the distance between the first surface and the second surface being much smaller than the distances across the first surface and the second surface;
(b) a peripheral boss extending perpendicularly from the first surface for forming a seal around the perimeter of the first surface;
(c) a first port extending through the disk shaped member from the first surface to the second surface and proximate the peripheral boss;
(d) a second port extending through the disk shaped member from the first surface to the second surface and proximate the axis of the disk shaped member;
(e) a third port extending through the disk shaped member from the first surface to the second surface, the third port being spaced away from the first and second ports, all of the ports being radially inward of the peripheral boss, wherein the first port, the second port, and the third port extend through the first surface and the second surface in a direction perpendicular to the first and second surfaces;
(f) a third port boss extending perpendicularly from the first surface and forming a seal around the third port on the first surface; and,
(g) a plurality of ribs extending perpendicularly from the first surface and radially from proximate the second port to proximate the peripheral boss, the plurality of ribs for forming radial passageways on the first surface.

32. The disk shaped member of claim 31, wherein the third port is proximate the peripheral boss.

33. The disk shaped member of claim 31, further comprising a central boss extending perpendicularly from the first surface and proximate the second port for forming a seal around the second port on the first surface.

34. A disk shaped member for a cell for producing a fluid product from a fluid feedstock comprising:
(a) a main body portion having a first surface on one side and an second surface on the opposite side, the distance between the first surface and the second surface being much smaller than the distances across the first surface and the second surface;
(b) a first peripheral boss extending perpendicularly from the first surface for forming a seal around the perimeter of the first surface;
(c) a first port extending through the disk shaped member from the first surface to the second surface;
(d) a second port extending through the disk shaped member from the first surface to the second surface;
(e) a third port extending through the disk shaped member from the first surface to the second surface, the first, second and third port being spaced away from each other, wherein the first port, the second port, and the third port extend through the first surface and the second surface in a direction perpendicular to the first and second surfaces;
(f) a third port boss extending perpendicularly from the first surface and forming a seal around the third port on the first surface;
(g) a plurality of ribs extending perpendicularly from the first surface for forming first passageways on the first surface;
(h) a second peripheral boss extending perpendicularly from the second surface for forming a seal around the perimeter of the second surface, the first, second and third ports being radially inward of the first peripheral boss and second peripheral boss;
(i) a second port boss extending perpendicularly from the second surface and proximate the second port for forming a seal around the second port on the second surface;
(j) a first port boss extending perpendicularly from the second surface for forming a seal around the first port on the second surface; and,
(k) a plurality of ribs extending perpendicularly from the second surface for forming second passageways on the second surface.

35. A disk shaped member for a cell for producing a fluid product from a fluid feedstock comprising:
   (a) a main body portion having an first surface on one side and an second surface on the opposite side, the distance between the first surface and the second surface being much smaller than the distances across the first surface and the second surface;
   (b) a first peripheral boss extending perpendicularly from the first surface for forming a seal around the perimeter of the first surface;
   (c) a first port extending through the disk shaped member from the first surface to the second surface and proximate the first peripheral boss;
   (d) a second port extending through the disk shaped member from the first surface to the second surface and proximate the axis of the disk shaped member;
   (e) a third port extending through the disk shaped member from the first surface to the second surface, the third port being spaced away from the first and second ports wherein the first port, the second port and the third port extend through the first surface and the second surface in a direction perpendicular to the first and second surfaces;
   (f) a third port boss extending perpendicularly from the first surface and forming a seal around the third port on the first surface;
   (g) a plurality of ribs extending perpendicularly from the first surface and radially from proximate the second port to proximate the first peripheral boss, the plurality of ribs for forming radial first passageways on the first surface;
   (h) a second peripheral boss extending perpendicularly from the second surface for forming a seal around the perimeter of the second surface, the first and third ports being radially inward of the first peripheral boss and second peripheral boss;
   (i) a central boss extending perpendicularly from the second surface and proximate the second port for forming a seal around the second port on the second surface;
   (j) a first port boss extending perpendicularly from the second surface for forming a seal around the first port on the second surface; and,
   (k) a plurality of ribs extending perpendicularly from the second surface and forming second passageways on the second surface.

36. The disk shaped member of claim 35, wherein the third port is proximate the first peripheral boss.

37. The disk shaped member of claim 35, wherein the plurality of ribs on the second surface radially extend from proximate the central boss to proximate the second peripheral boss and form radial second passageways on the second surface.

38. The disk shaped member of claim 35, wherein the disk shaped member is an electrode, and wherein the first surface and second surface are impervious to fluid flow.

39. The disk shaped member of claim 35, wherein the disk shaped member is formed from a solid ceramic material that is an electrode material, and wherein the first surface and second surface are impervious to fluid flow.

40. The disk shaped member of claim 35, wherein the disk shaped member is formed from a solid ceramic material that is operable as a membrance material, and wherein the first surface and second surface are pervious to fluid product ion flow.

41. The disk shaped member of claim 35, wherein the disk shaped member has a thickness from about 0.05 mm to about 1.5 mm,
   wherein the bosses and the ribs extend from the first surface and the second surface a distance of from about 0.05 mm to about 1.5 mm, and
   wherein the ribs have a width of from about 0.05 mm to about 1.5 mm.

42. The disk shaped member of claim 35, wherein the third port is proximate the first peripheral boss.

43. The disk shaped member of claim 35, wherein the ribs extending from the first surface and the second surface were formed by an embossing process.

44. A disk shaped member for a cell comprising:
   (a) a main body portion having a first surface on one side and a second surface on the opposite side, the distance between the first surface and the second surface being much smaller than the distances across the first surface and the second surface;
   (b) a peripheral boss extending perpendicularly from the first surface for forming a seal around the perimeter of the first surface;
   (c) a first port extending through the disk shaped member from the first surface to the second surface;
   (d) a second port extending through the disk shaped member from the first surface to the second surface;
   (e) a third port extending through the disk shaped member from the first surface to the second surface, the first, second and third port being spaced away from each other and radially inward of the peripheral boss, wherein the first port, the second port and the third port extend through the first surface and the second surface in a direction perpendicular to the first and second surface;
   (f) a third port boss extending perpendicularly from the first surface and forming a seal around the third port on the first surface; and,
   (g) a plurality of ribs extending perpendicularly from the first surface for forming passageways on the first surface, wherein the ribs were formed by an embossing process.

45. The disk shaped member of claim 44, wherein the peripheral boss and the third port boss extending perpendicularly from the first surface were formed by an embossing process.

46. A disk shaped member for a cell comprising:
   (a) a main body portion having a first surface on one side and a second surface on the opposite side, the distance between the first surface and the second surface being much smaller than the distances across the first surface and the second surface;
   (b) a peripheral boss extending perpendicularly from the first surface for forming a seal around the perimeter of the first surface;

(c) a first port extending through the disk shaped member from the first surface to the second surface and proximate the peripheral boss;

(d) a second port extending through the disk shaped member from the first surface to the second surface and proximate the axis of the disk shaped member;

(e) a third port extending through the disk shaped member from the first surface to the second surface, the third port being spaced away from the first and second ports, all of the ports being radially inward of the peripheral boss, wherein the first port, the second port and the third port extend through the first surface and the second surface in a direction perpendicular to the first and second surfaces;

(f) a third port boss extending perpendicularly from the first surface and forming a seal around the third port on the first surface; and, (g) a plurality of ribs extending perpendicularly from the first surface and radially from proximate the second port to proximate the peripheral boss, the plurality of ribs for forming radial passageways on the first surface, wherein the ribs were formed by an embossing process.

47. The disk shaped member of claim 46, wherein the peripheral boss and the third port boss extending perpendicularly from the first surface were formed by an embossing process.

48. A disk shaped member for a cell for producing a fluid product from a fluid feedstock comprising:

(a) a main body portion having an first surface on one side and an second surface on the opposite side, the distance between the first surface and the second surface being much smaller than the distances across the first surface and the second surface;

(b) a first peripheral boss extending perpendicularly from the first surface for forming a seal around the perimeter of the first surface;

(c) a first port extending through the disk shaped member from the first surface to the second surface;

(d) a second port extending through the disk shaped member from the first surface to the second surface;

(e) a third port extending through the disk shaped member from the first surface to the second surface, the first, second and third port being spaced away from each other, wherein the first port, the second port, and the third port extend through the first surface and the second surface in a direction perpendicular to the first and second surfaces;

(f) a third port boss extending perpendicularly from the first surface and forming a seal around the third port on the first surface;

(g) a plurality of ribs extending perpendicularly from the first surface for forming first passageways on the first surface, wherein the ribs were formed by an embossing process;

(h) a second peripheral boss extending perpendicularly from the second surface for forming a seal around the perimeter of the second surface, the first, second and third ports being radially inward of the first peripheral boss and second peripheral boss;

(i) a second port boss extending perpendicularly from the second surface and proximate the second port for forming a seal around the second port on the second surface;

(j) a first port boss extending perpendicularly from the second surface for forming a seal around the first port on the second surface; and, (k) a plurality of ribs extending perpendicularly from the second surface for forming second passageways on the second surface, wherein the ribs were formed by an embossing process.

49. The disk shaped member of claim 48, wherein the first peripheral boss and the third port boss extending perpendicularly from the first surface, and wherein the second peripheral boss, the second port boss and third port boss extending perpendicularly from the second surface, were formed by an embossing process.

* * * * *